United States Patent
Hilton

(10) Patent No.: US 9,389,904 B2
(45) Date of Patent: Jul. 12, 2016

(54) APPARATUS, SYSTEM AND METHOD FOR HETEROGENEOUS DATA SHARING

(71) Applicant: Proximal Systems Corporation, Holladay, UT (US)

(72) Inventor: Ronald N. Hilton, Holladay, UT (US)

(73) Assignee: Proximal Systems Corporation, Holladay, UT (US)

( * ) Notice: Subject to any disclaimer, the term of this patent is extended or adjusted under 35 U.S.C. 154(b) by 27 days.

(21) Appl. No.: 13/955,991

(22) Filed: Jul. 31, 2013

(65) Prior Publication Data
US 2013/0339979 A1    Dec. 19, 2013

Related U.S. Application Data

(63) Continuation of application No. 12/240,685, filed on Sep. 29, 2008, now Pat. No. 8,527,991.

(51) Int. Cl.
G06F 9/46 (2006.01)
G06F 9/50 (2006.01)

(52) U.S. Cl.
CPC ............. *G06F 9/46* (2013.01); *G06F 9/5033* (2013.01); *G06F 9/5044* (2013.01); *G06F 2209/509* (2013.01)

(58) Field of Classification Search
None
See application file for complete search history.

(56) References Cited

U.S. PATENT DOCUMENTS

| | | | |
|---|---|---|---|
| 6,021,408 A * | 2/2000 | Ledain et al. | 707/823 |
| 2006/0047718 A1* | 3/2006 | Keith | G06F 12/0831 |
| 2007/0011272 A1* | 1/2007 | Bakke et al. | 709/217 |
| 2007/0094402 A1 | 4/2007 | Stevenson et al. | |
| 2008/0140932 A1* | 6/2008 | Flynn et al. | 711/114 |

FOREIGN PATENT DOCUMENTS

WO    98/35291 A1    8/1998

* cited by examiner

*Primary Examiner* — George Giroux
(74) *Attorney, Agent, or Firm* — Kunzler Law Group

(57) ABSTRACT

An apparatus, system, and method are disclosed for offloading data processing. An offload task hosted on a first data processing system provides internal functionality substantially equivalent to that of a second task 304 hosted on a second data processing system of a potentially different architecture. A proxy task hosted on the second data processing system provides an external interface substantially equivalent to that of the second task. A communication mechanism between the first and second data processing systems may be comprised of a network, shared storage, and shared memory. The proxy task substantially replaces the second task, delegating the internal functionality of the second task to the offload task via mapping of arguments and accessing and translating of input and output data as required.

20 Claims, 5 Drawing Sheets

APPARATUS, SYSTEM AND METHOD FOR HETEROGENEOUS DATA SHARING

CROSS-REFERENCES TO RELATED APPLICATIONS

This application is a continuation of and claims priority to U.S. patent application Ser. No. 12/240,685 entitled "APPARATUS, SYSTEM AND METHOD FOR CROSS-SYSTEM PROXY-BASED TASK OFFLOADING" and filed on Sep. 29, 2008 for Ronald N. Hilton, which is incorporated herein by reference.

BACKGROUND

1. Field

This invention relates to cross-system coupling and more particularly relates to the offloading of computing tasks from one data processor or processing system to another data processor or processing system.

2. Description of the Related Art

As is known in the art, special-purpose offload processors are employed to perform certain computing tasks more efficiently than a general-purpose processor or processing system. Such processors have been implemented as a coprocessor attached to a general-purpose processor which augments the processing capabilities of the latter to perform specialized operations such as floating-point, vector or cryptographic processing. Alternatively, the offload processors may be implemented as peers of the general-purpose processors in a multi-processing system, with the ability to run specialized tasks concurrently with other tasks running on the general-purpose processors. An example of the latter would be the zAAP and zIIP processor types in a z/Architecture mainframe system, which run under the control of the z/OS operating system but are confined to certain types of tasks such as Java applets and database queries.

In a traditional offload processor design, the general-purpose and the offload processors all run within the same data processing system, as defined by the same overall architecture, and under the control of the same executive. Such a tightly-coupled design tends to minimize communication latency, but also limits flexibility and increases cost by failing to exploit the wide variety of computing systems with differing architectures and price points that are available in the marketplace today.

SUMMARY

From the foregoing discussion, it should be apparent that a need exists for an apparatus, system, and method that seamlessly offloads processing of computing tasks from one data processor or processing system to another data processor or processing system of a potentially different architecture. Beneficially, such an apparatus, system, and method would exhibit the flexibility and cost-effectiveness of cross-system coupling while achieving the transparency and high efficiency of tightly-coupled offload processors.

The present invention has been developed in response to the present state of the art, and in particular, in response to the problems and needs in the art that have not yet been fully solved by currently available offload processors. Accordingly, the present invention has been developed to provide an apparatus, system, and method for offloading processing from one data processing system to another data processing system of a potentially different architecture that overcome many or all of the above-discussed shortcomings in the art.

Each data processing system may include a software stack running on one or more processors, memory, I/O (Input/Output) device interfaces, and network interfaces, connected through a bus. The data processing systems may also consist of separate logical or physical partitions of a larger data processing system, with some or all of the aforementioned system components dedicated to a specific partition or shared between multiple partitions in a virtualized manner.

The task to be offloaded is hosted on a first data processing system, and extends its services to a second data processing system via a proxy which is hosted on the second system. The task and its proxy each relies upon its respective local host for basic operating system services such as dispatching processor resources, memory management, I/O device access, and facilities to communicate with the other system.

At the application level, the offload task has the primary responsibility for the internal functions of the application, and the proxy task has the primary responsibility for external communication with other related tasks on the second system. The offload task and its proxy communicate with each other in a manner specific to needs of the application, effectively operating as coroutines comprising a single logical task.

The more efficient the underlying facilities for inter-system communication, the more the efficiency of the overall mechanism may approach that of the tightly-coupled offload mechanisms in the prior art, but without the added cost and inflexibility associated with such special-purpose mechanisms.

Note that the role of first and second data processing system is task-dependent. A system may serve as the offload system for one task while simultaneously serving as the proxy system for another task The apparatus to offload data processing is provided with a plurality of modules configured to functionally execute the necessary steps of external communication, delegating internal functions, and reporting completion. These modules in the described embodiments include the proxy task and the offload task.

The apparatus, in one embodiment, is configured to map arguments and access and format input and output data as required. Accessing data may include a physical connection to the appropriate storage device, the physical layout of the data, and the appropriate file system or access method dictating the logical layout of the data. Formatting may include translating the data into an intelligible format.

A system of the present invention is also presented to offload data processing. The system may be embodied to include a first and a second data processing system, a communication mechanism, the offload task and proxy task, and a storage system to store the input and output data. In particular, the system, in one embodiment, includes a network as part of the communication mechanism.

The system may further include shared storage between the first and second data processing systems. Some or all of the storage system may be shared in that manner.

The system is further configured, in one embodiment, to operate on data that is already stored in memory. In such a case, the involvement of the storage system is not required. In a further embodiment, the system may be configured to hold some or all of the data in a shared memory that is directly accessible to both the first and second data processing systems.

The first and second data processing systems may include first and potentially different second hardware platforms, firmware, and operating systems. For example, operating systems may include OS/390, z/OS, Windows, Unix, and Linux.

A method of the present invention is also presented for offloading data processing. The method in the disclosed embodiments substantially includes the steps necessary to carry out the functions presented above with respect to the operation of the described apparatus and system. In one embodiment, the method includes receiving a request to launch an offload task from a proxy task; mapping the request into a form that is intelligible to the first data processing system, performing the internal functionality by the offload task, and reporting the completion of the offload task to the proxy task.

In a further embodiment, the method also may include reading and writing data, either directly or indirectly, depending upon whether the first data processing system has access to data of the second data processing system. Access to data may include a physical connection to the appropriate storage device, the physical layout of the data, the appropriate access method dictating the logical layout of the data, and translation of the data into an intelligible format. Any of the steps of the method may be performed one or more times in response to a single invocation of the proxy task.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
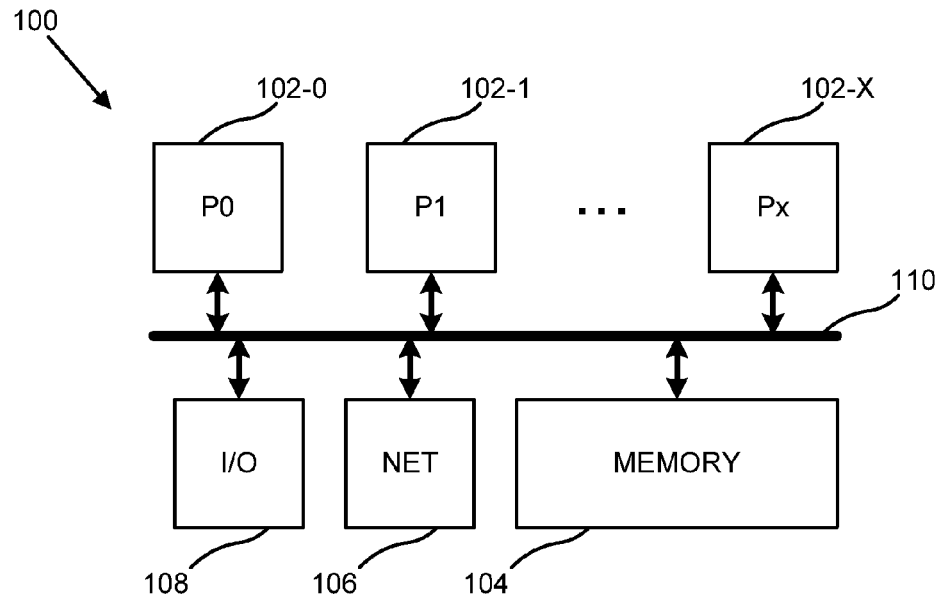
FIG. 1 is a schematic block diagram illustrating a possible computer hardware platform upon which the present invention may be at least in part deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a possible computer hardware platform 100 upon which the present invention may be at least in part deployed. The hardware platform 100 may include processor(s) 102, memory 104, a network interface 106, and an I/O (Input/Output) device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the I/O device interface 108.

The I/O device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
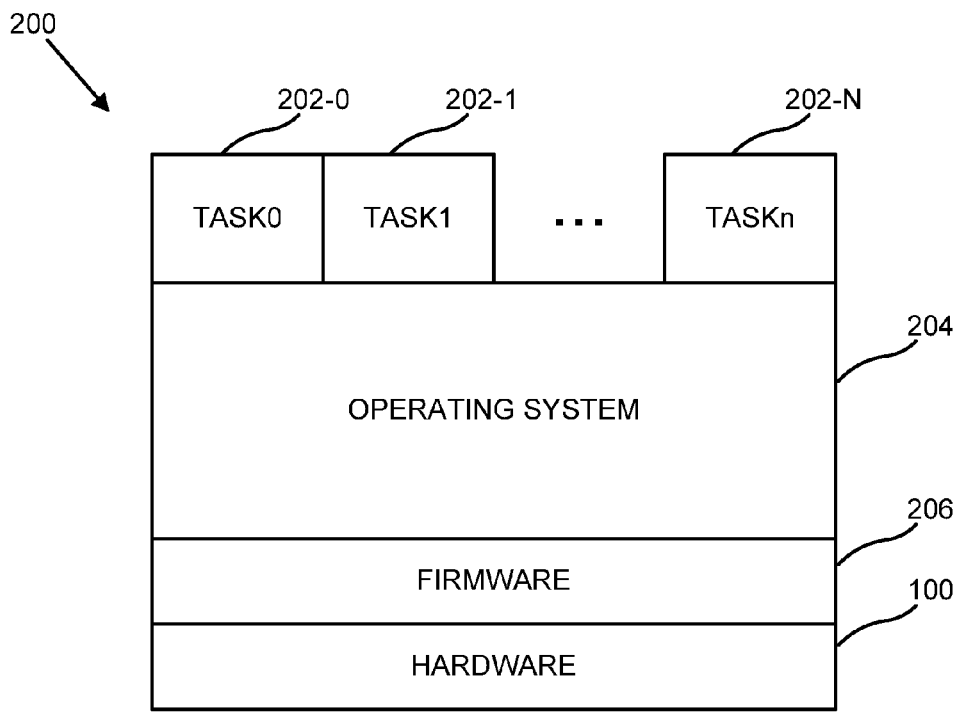
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
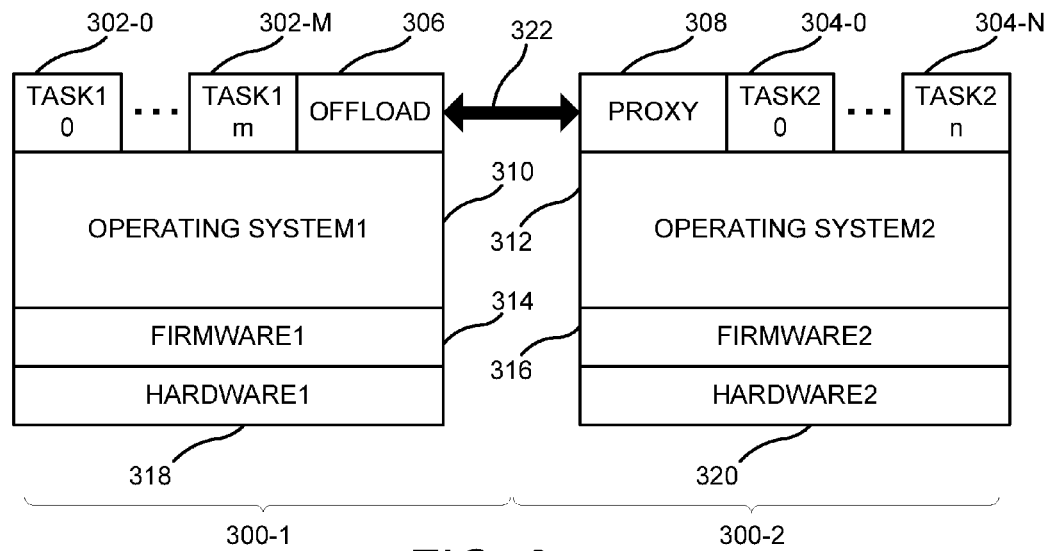
FIG. 3 is a schematic block diagram of two computers operating according to the present invention.

FIG. 3 is a schematic block diagram of two computers 200 including their respective software stacks operating according to the present invention. The first and second software stacks may respectively include first task(s) 302 and second task(s) 304 which may or may not differ as to number and function, hosted respectively on a first operating system 310 and on a potentially different second operating system 312, enabled respectively by first firmware 314 and by a potentially different second firmware 316, and running respectively on a first hardware platform 318 and on a potentially different second hardware platform 320. Said hardware platforms may also be logical or physical partitions of one or more larger hardware platforms.

Of particular relevance to the present invention are the offload task 306 and the proxy task 308. These tasks are hosted respectively on the first and second software stacks executing respectively on first and second hardware platforms 318 and 320, hereinafter referred to respectively as a first data processing system 300-1 and a second data processing system 300-2. The offload task 306 and its corresponding proxy task 308 each relies upon its respective local host, the first data processing system 300-1 and the second data processing system 300-2, for basic operating system services such as dispatching processor resources, memory management, I/O device access, and facilities to communicate with the other system.

The offload task 306 on the first data processing system 300-1 extends its services to the second data processing system 300-2 via the proxy task 308. At the application (or middleware or driver) level, the offload task 306 has the primary responsibility for the internal functions of the application, and the proxy task 308 has the primary responsibility for external communication with other related second tasks 304 on the second data processing system 300-2. The offload task 306 and its proxy task 308 communicate with each other via communication mechanism 322 in a manner specific to the needs of the application, effectively operating as coroutines comprising a single logical task.

Figure 4:
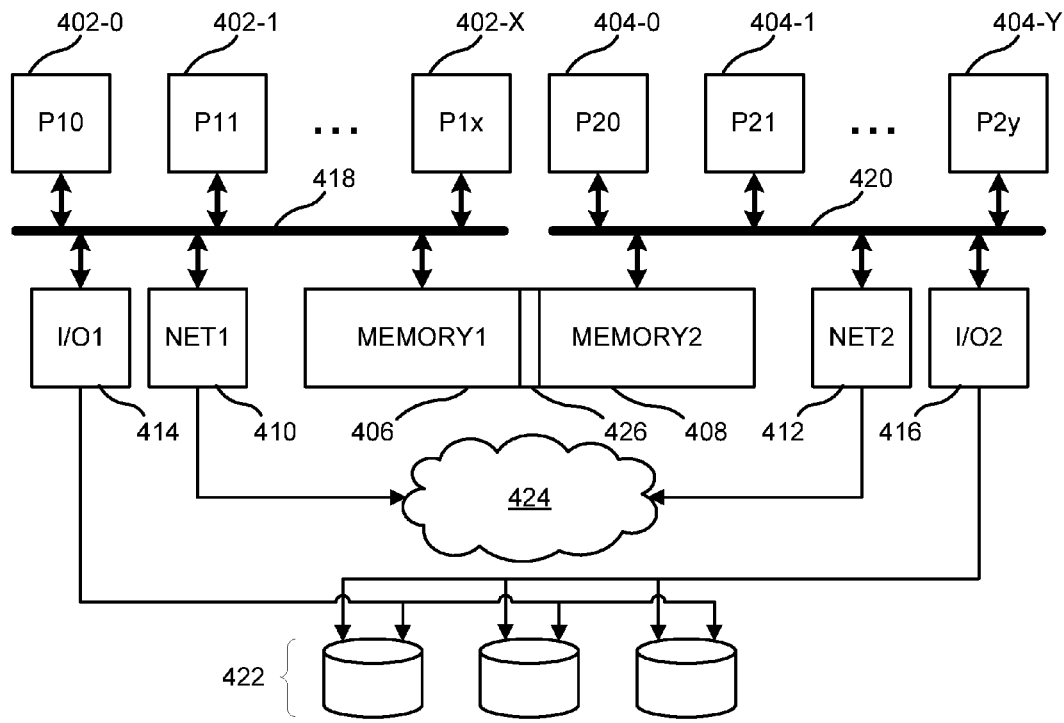
FIG. 4 is a schematic block diagram of a possible hardware configuration of multiple data processing systems to execute the present invention.

FIG. 4 is a schematic block diagram of a possible hardware configuration of multiple data processing systems to execute the present invention, illustrating several potential pathways for the communication mechanism 322 in FIG. 3. The first data processing system 300-1 and the second data processing system 300-2 may respectively include first processor(s) 402 and second processor(s) 404, first memory 406 and second memory 408, first network interface 410 and second network interface 412, first I/O device interface 414 and second I/O device interface 416, connected through first bus 418 and second bus 420.

The most remote, highest latency, but nevertheless useful communication pathway would be via shared storage 422 supporting connections from both first I/O device interface 414 and second I/O device interface 416. Technology exists whereby the same storage device can support the I/O interface of differing system architectures protocols, thereby allowing the first data processing system 300-1 to access the storage data of the second data processing system 300-2 and vice-versa.

A less remote, lower latency communication pathway would be via network 424, supporting connections from both first network interface 410 and second network interface 412. Some network protocols such as TCP/IP allow the exchange of message packets of information between systems. Other protocols such as Infiniband support VIA (Virtual Interface Architecture) which allow direct sharing of memory between first task(s) 302 and second task(s) 304, using RDMA (Remote Direct Memory Access) via network 424 to permit the first data processing system 300-1 to access second memory 408 and the second data-processing system 300-2 to access first memory 406.

The least remote, lowest latency communication pathway involves the actual sharing of memory between the first and second data processing systems 300, as illustrated by the shared memory overlap 426 between first memory 406 and second memory 408. This type of memory sharing requires that the first and second data processing systems 300 be logical or physical partitions within the same physical data processing system. The same communication protocols as used in network 424 can be used at memory speed via shared memory 426, including TCP/IP and Infiniband. The latter protocol may be particularly well-suited to the needs of the present invention, because it allows the offload task 306 and the proxy task 308 to interoperate as if they were indeed coroutines executing out of the same memory on the same physical data processing system, thus approaching the efficiency of the prior-art special-purpose offload mechanisms.

Technology exists and is now emerging which allows first firmware 314 and second firmware 312 of differing architectures (e.g. PCMware of Platform Solutions, Inc.) as well as first processor(s) 402 and second processor(s) 404 of differing architectures (e.g. Common System Interface of Intel Corporation) to coexist within the same physical, partitionable data processing system. Such a hybrid system may provide a particularly suitable enabling platform for the present invention.

Figure 5:
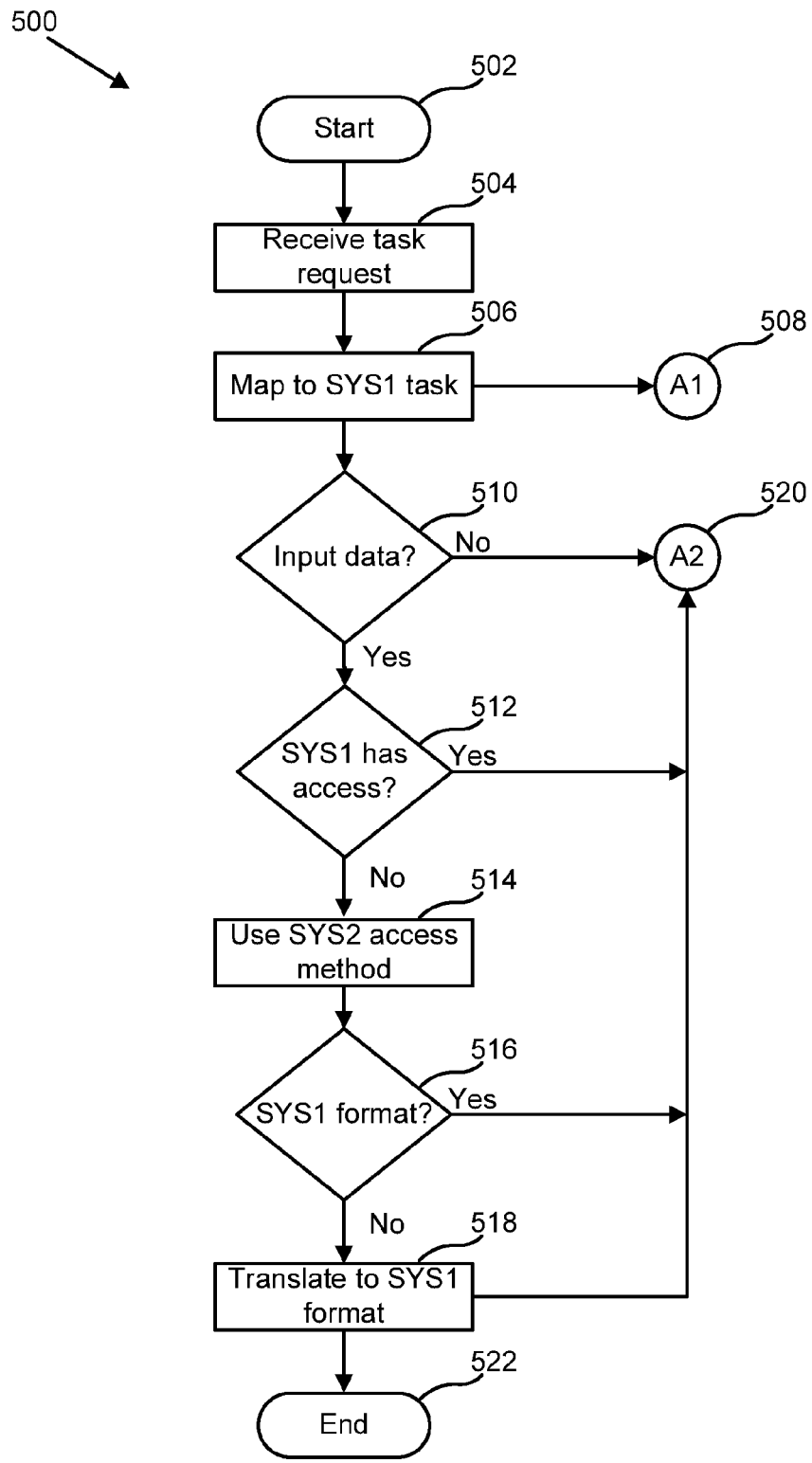
FIG. 5 is a schematic flow chart diagram illustrating one embodiment of a method for launching a offload task from a proxy task in accordance with the present invention.

FIG. 5 is a schematic flow chart diagram illustrating one embodiment of a method 500 for launching an offload task 306 from a proxy task 308 in accordance with the present invention. The method 500 starts 502 when a proxy task request is received 504 on the second data processing system 300-2. The request is mapped 506 into a form that is intelligible to the first data processing system 300-1 and transmitted 508 to the first data processing system 300-1 via node A1 as an offload task request.

If there is additional input 510 data provided beyond the immediate arguments received 504 with the task request, then it must be determined whether the first data processing system 300-1 has accessibility 512 to such data directly. That accessibility 512 may include a physical connection to the appropriate storage device, the physical layout of the data, the appropriate access method dictating the logical layout of the data, and the intelligibility of the data once it is read. If any such required condition is not met, then the proxy task 308 must access 514 the input data on behalf of the first data processing system 300-1. Once the data has been accessed 514, it may or may not be in a format 516 that is intelligible to the first data processing system 300-1. Note that the intelligibility of format 516 was also one of the conditions comprising accessibility 512. If that condition is not met, then the proxy task 308 must first translate 518 the input data into a format that is intelligible to the first data processing system 300-1 before it can be transmitted 520 to the first data processing system 300-1 via node A2. At this point the proxy task 308 processing is suspended, freeing its resources for other processing by the second data processing system 300-2, and the method 500 ends 522.

Figure 6:
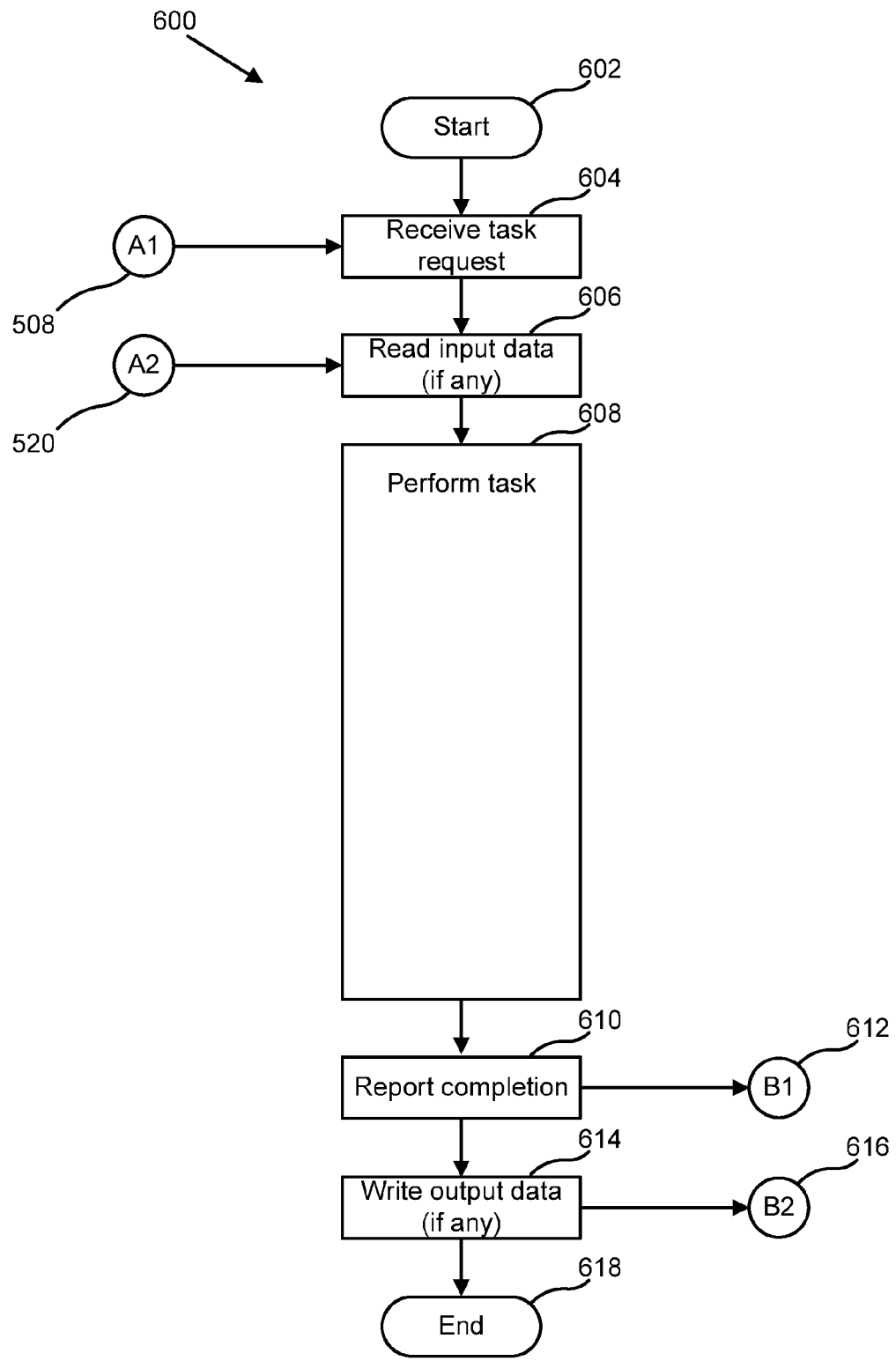
FIG. 6 is a schematic flow chart diagram illustrating one embodiment of a method for an offload task in accordance with the present invention.

FIG. 6 is a schematic flow chart diagram illustrating one embodiment of a method 600 for an offload task 306 in accordance with the present invention. The method 600 starts 602 and the offload task request is received 604 as transmitted 508 from the second data processing system 300-2 via node A1. Pending the receipt of any additional input 606 data as transmitted 520 from the second data processing system 300-2 via node A2, the offload task 306 is performed 608 using the resources of the first data processing system 300-1. Upon completion a report 610 is transmitted 612 to the second data processing system 300-2 via node B2. Additional output 614 data if any is transmitted 616 to the second data processing system 300-2 via node B2, and the method 600 ends 618.

Figure 7:
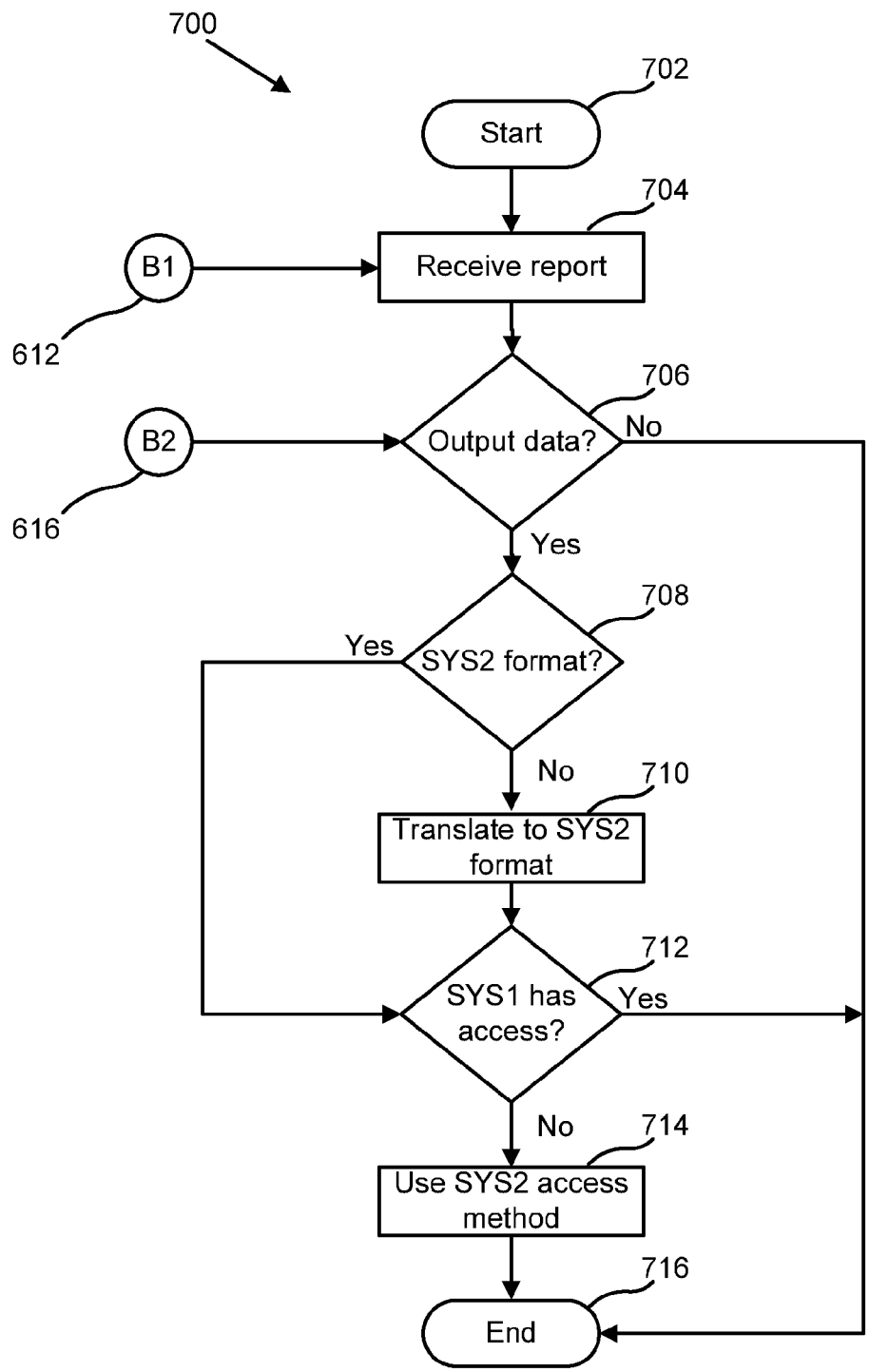
FIG. 7 is a schematic flow chart diagram illustrating one embodiment of a method for capturing results from an offload task by a proxy task in accordance with the present invention.

FIG. 7 is a schematic flow chart diagram illustrating one embodiment of a method 700 for capturing results from an offload task 306 by a proxy task 308 in accordance with the present invention. The method 700 starts 702 and the proxy task 308 is reawakened in response to receiving 704 the report that was transmitted 612 from the first data processing system 300-1 via node B1.

If there is no additional output 706 data received as transmitted 616 from the first data processing system 300-1 via node B2, beyond the immediate arguments associated with the report that was received 704, then the method 700 ends 716. If additional output 706 data is received, it must be determined whether that data is in a format 708 that is intelligible to the second data processing system 300-2. If not then the proxy task 308 must first translate 710 the output data to a format intelligible to the second data processing system 300-2 before making it accessible 712 to the second data processing system 300-2. That accessibility 712 may include a physical connection to the appropriate storage device, the physical layout of the data, and the appropriate access method dictating the logical layout of the data. If the output data is accessible 712, then the method 700 ends 716. If any of the required conditions of accessibility 712 is not met, then the second data processing system 300-2 must access 714 the output data on behalf of the first data processing system 300-1. Once the output data has been made available for access 714 to the second data processing system 300-2 then the method 700 ends 716.

Methods 500, 600 and 700 may be further illustrated with a specific example. Consider a sorting program (the second task 304) running under z/OS on an IBM mainframe (the second data processing system 300-2), to be offloaded to Windows running on an Intel server (the first data processing system 300-1). The data to be sorted is in EBCDIC (Extended Binary Coded Decimal Interchange Code) format, residing in a VSAM (Virtual Storage Access Method) data set (file) on CKD (Count Key Data) DASD (Direct Access Storage Device) connected via an ESCON (Enterprise System CONnection) interface. The proxy task 308 may either be specified in a JCL (Job Control Language) EXEC statement, or the executable file for the z/OS sorting program itself may be replaced by that of the proxy task 308. Once that initial configuration has been completed, no further user interaction is required beyond that which is normally performed to run the z/OS sorting program. Whenever the z/OS sorting program is invoked thereafter, a request for the proxy task 308 will be automatically received 504 and its arguments mapped 506 to a corresponding Windows sorting program.

In this example, the input 510 data to be sorted must be provided to the offload task 306. Windows may or may not have direct accessibility 512 to the data. ESCON may be the only physical connection available that is native to z/OS, whereas Windows may only support FC (Fiber Channel) connectivity. On the other hand, some storage devices do support both ESCON and FC, as well as FICON (ESCON over FC). The native z/OS physical layout of the data is CKD, but Windows typically expects FBA (Fixed Block Architecture). The native z/OS access method for the data is VSAM, but Windows may likely be based upon NTFS (New Technology File System). The native z/OS format of the data is EBCDIC, but the Windows sorting program may assume that the data format is ASCII (American Standard Code for Information Interchange). None of these differences is insurmountable. Drivers and translators may exist or can be developed under Windows to provide accessibility 512. If such are not available, then the offload task 306 under Windows must access 514 the data indirectly from z/OS, requesting that it be read using second I/O device interface 416 and transferred to Windows over network 424 or through a commonly accessible buffer in shared memory 426. Then the data, which in this example is in EBCDIC format 516, must be translated 518 to ASCII.

At this point the proxy task 308 processing is suspended, freeing its resources for other z/OS processing, and the offload task 306 performs 608 the Windows sorting program. Upon completion a report 610 is transmitted 612 from Windows to z/OS and the sorted output 614 data is also transmitted 616. However, in this example the output 614 data is in ASCII format 708 and must therefore be translated 710 back to EBCDIC. Furthermore, Windows does not have direct accessibility 712 to the z/OS data set to which the output data must be written. Therefore proxy task 308 under z/OS must transfer the data from Windows to z/OS indirectly over network 424 or through a commonly accessible buffer in shared memory 426, accessing 714 the z/OS data set to write the data using the second I/O device interface 416.

As alluded to in the foregoing example, other potentially more efficient embodiments are possible in which Windows has a greater degree of accessibility 512 and 712 to z/OS data, including physical interfaces, drivers, and translators specifically designed to access and/or emulate z/OS DASD. In another embodiment, the data may exist in an interim state in second memory 408, accessible to offload task 306 via network 424 or shared memory 426, or directly resident in shared memory 426. In that case, physical storage connectivity and layout would not be an issue, although other accessibility factors such as logical layout and format might still require drivers or translators. In a further embodiment, full in-memory same-format accessibility may exist, thus permitting very rapid, closely coupled interaction between proxy task 308 and offload task 306. It should be noted that methods 500 and 700 may be invoked more than once by the same proxy task 308, with corresponding multiple invocations of method 600 by the same offload task 306, in a fine-grained piecemeal fashion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for heterogeneous data sharing, the apparatus comprising:
   a storage module that stores data in a storage subsystem for sharing between a first data processing system and a second data processing system, wherein the data is not native to the first data processing system;
   a read module that makes the data directly accessible for reading as input data from the storage subsystem to the first data processing system;
   a write module that makes the data directly accessible for writing as output data from the first data processing system to the storage subsystem; and
   a proxy module that acts as a proxy task on the second data processing system and is responsible for communication with other related tasks on the second data processing system during the reading of the data by the read module and the writing of the data by the write module, wherein the proxy module relies on basic services of the second data processing system to support coherency between the other related tasks and the proxy task, as if the reading and the writing of the data were being done by the proxy task instead of by the first data processing system
   wherein the storage module, the read module, the write module, and the proxy module comprise one or more of logic hardware and executable code, the executable code stored on one or more non-transitory computer-readable media.

2. The apparatus of claim 1, wherein making the data directly accessible further comprises accessing and formatting of the input and output data as required.

3. The apparatus of claim 2, further comprising a driver for the first data processing system capable of accessing a physical connection to, and physical layout of, input and output data that is native to the second data processing system.

4. The apparatus of claim 2, further comprising a file system for the first data processing system capable of accessing a logical layout of the input and output data that is native to the second data processing system.

5. The apparatus of claim 2, further comprising a translator for the first data processing system capable of translating a format of the input and output data that is native to the second data processing system.

6. A system for heterogeneous data sharing, the system comprising:
   a first data processing system comprised of a first operating system, a first firmware, and a first hardware platform;

a second data processing system comprised of a second operating system, a second firmware, and a second hardware platform;

a communication mechanism between the first data processing system and the second data processing system;

a storage subsystem that is operatively coupled to at least one of the communication mechanism, the first data processing system, and the second data processing system;

a storage module that stores data in the storage subsystem for sharing between the first data processing system and the second data processing system, wherein the data is not native to the first data processing system;

a read module that makes the data directly accessible for reading as input data from the storage subsystem to the first data processing system;

a write module that makes the data directly accessible for writing as output data from the first data processing system to the storage subsystem; and a proxy module that acts as a proxy task on the second data processing system and is responsible for communication with other related tasks on the second data processing system during the reading of the data by the read module and the writing of the data by the write module, wherein the proxy module relies on basic services of the second data processing system to support coherency between the other related tasks and the proxy task, as if the reading and the writing of the data were being done by the proxy task instead of by the first data processing system wherein the storage module, the read module, the write module, and the proxy module comprise one or more of logic hardware and executable code, the executable code stored on one or more non-transitory computer-readable media.

7. The system of claim 6, wherein the communication mechanism comprises a network.

8. The system of claim 6, wherein the first hardware platform includes a first memory and the second hardware platform includes a second memory, and the input and output data is stored within one or more of the first memory and the second memory.

9. The system of claim 8, wherein the first memory and the second memory at least partially overlap to form a shared memory, and the input and output data is stored at least partially within the shared memory.

10. The system of claim 6, wherein the first hardware platform differs from the second hardware platform.

11. The system of claim 6, wherein the first firmware differs from the second firmware.

12. The system of claim 6, wherein the first operating system differs from the second operating system.

13. The system of claim 12, wherein the first operating system and the second operating system are selected from the set consisting of a 32-bit operating system ("OS"), 64-bit OS, mainframe OS, server OS, desktop OS, proprietary OS, and open-source OS.

14. A computer program product comprising a non-transitory computer readable medium having computer usable program code executable to perform operations for heterogeneous data sharing, the operations of the computer program product comprising:

storing data in a storage subsystem for sharing between a first data processing system and a second data processing system, wherein the data is not native to the first data processing system;

making the data directly accessible for reading as input data from the storage subsystem to the first data processing system;

making the data directly accessible for writing as output data from the first data processing system to the storage subsystem; and providing a proxy that acts as a proxy task on the second data processing system and is responsible for communication with other related tasks on the second data processing system during the reading of the data and the writing of the data, wherein the proxy relies on basic services of the second data processing system to support coherency between the other related tasks and the proxy task, as if the reading and the writing of the data were being done by the proxy task instead of by the first data processing system.

15. The computer program product of claim 14, further comprising reading the input data from the storage subsystem to the first data processing system.

16. The computer program product of claim 14, further comprising writing the output data from the first data processing system to the storage subsystem.

17. A machine-implemented method for heterogeneous data sharing, the method comprising the steps of:

storing data in a storage subsystem for sharing between a first data processing system and a second data processing system, wherein the data is not native to the first data processing system;

making the data directly accessible for reading as input data from the storage subsystem to the first data processing system;

making the data directly accessible for writing as output data from the first data processing system to the storage subsystem; and providing a proxy that acts as a proxy task on the second data processing system and is responsible for communication with other related tasks on the second data processing system during the reading of the data and the writing of the data, wherein the proxy relies on basic services of the second data processing system to support coherency between the other related tasks and the proxy task, as if the reading and the writing of the data were being done by the proxy task instead of by the first data processing system.

18. The method of claim 17, wherein making the data directly accessible comprises accessing a physical connection to, and physical layout of, input and output data that is native to the second data processing system.

19. The method of claim 17, wherein making the data directly accessible comprises accessing a logical layout of input and output data that is native to the second data processing system.

20. The method of claim 17, wherein making the data directly accessible comprises translating a format of input and output data that is native to the second data processing system.

* * * * *